(12) United States Patent
Li et al.

(10) Patent No.: US 7,757,566 B2
(45) Date of Patent: Jul. 20, 2010

(54) TESTING SYSTEM FOR FLIP-TYPE ELECTRONIC DEVICE

(75) Inventors: Lei Li, Shenzhen (CN); Ping Chen, Shenzhen (CN); Zhi Cheng, Shenzhen (CN); Xue-Liang Zhai, Shenzhen (CN); Ming-Feng Li, Shenzhen (CN); Chang-Fa Sun, Shenzhen (CN); Dong Li, Shenzhen (CN); Yong-Zhi Tao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 353 days.

(21) Appl. No.: 11/865,629

(22) Filed: Oct. 1, 2007

(65) Prior Publication Data
US 2008/0173110 A1    Jul. 24, 2008

(30) Foreign Application Priority Data
Jan. 24, 2007   (CN) .......................... 2007 1 0073104

(51) Int. Cl.
G01N 3/32 (2006.01)

(52) U.S. Cl. .......................................... 73/810; 73/849
(58) Field of Classification Search ................ 73/865.6, 73/865.9, 865.3, 810, 849
See application file for complete search history.

(56) References Cited

FOREIGN PATENT DOCUMENTS

| CN | 200962616 Y | * | 10/2007 |
| CN | 201145581 Y | * | 11/2008 |
| KR | 2005111012 A | * | 11/2005 |

* cited by examiner

Primary Examiner—Hezron Williams
Assistant Examiner—Nashmiya S Fayyaz
(74) Attorney, Agent, or Firm—Jeffrey T. Knapp

(57) ABSTRACT

A testing system (100) is used to test a flip-type electronic device (80). The electronic device includes a cover (802) and a main body (801). A hinge (803) connects with the cover and the main body. The testing system includes a base (10), a plummer (20), a flipping device (30) and a control device (40). The plummer is fixed on the base for locking the electronic device. The flipping device is fixed on the base for opening and closing the cover of the electronic device. The control device includes an optical fiber sensor (42) for sensing the movement of the cover of the electronic device. The control device connects with the flipping device so as to control the flipping device.

14 Claims, 6 Drawing Sheets

TESTING SYSTEM FOR FLIP-TYPE ELECTRONIC DEVICE

BACKGROUND OF THE INVENTION

1. Field of the Invention

The present invention relates to test systems and, particularly, to a test system for a flip-type electronic device.

2. Description of Related Art

With the development of wireless communication and information processing technologies, portable electronic devices such as mobile telephones, are now in widespread use. Since the flip-type electronic devices are small and conveniently carried, most customers pay more attention to the flip-type electronic devices than the other types electronic device. It is understood that each flip-type electronic device includes a main body and a cover. A hinge connects the main body and the cover, and the cover can rotate relative to the main body under the role of the hinge. However, after more repeated use, the hinge may fail to work which results in not being able to open the cover. This affects the quality and the longevity of the electronic device. Therefore, it is necessary to do a failure test for the hinge before distribute the flip-type electronic devices out on the market.

In a conventional failure test for a flip-type electronic device, an operator opens and closes a cover of the electronic device by hand to test the failure of the electronic device. During operation, the operator not only counts how many times the electronic device has been unfolded or folded, but also observes the durability of the hinge. This method greatly wastes time and energy of the operator. In addition, the test efficiency is low, and the test result is not accurate.

In order to increase efficiency of the test, a typical testing system for flip-type electronic device is disclosed in China Patent Number 200420105655.7, which is issued on Feb. 22, 2006. The testing system includes a control device, a flipping device, a holding device and a base. The control device is electronically connected with the flipping device. The flipping device and the holding device are fixed on the base. In use, a flip-type electronic device is fixed in the holding device, and the flipping device repeatedly opens and closes a cover of the electronic device. The control device may count how many times the electronic device has been opened or closed. However, the testing system itself cannot automatically judge whether the hinge is failed, but judge by means of visual, so as to determine whether the test system is closed. Therefore, the test result might be not accurate.

Therefore, a new testing system is desired in order to overcome the above-described problems.

SUMMARY OF THE INVENTION

In one embodiment thereof, a testing system is used to test a flip-type electronic device. The electronic device includes a cover and a main body. A hinge connects with the cover and the main body. The testing system includes a base, a plummer, a flipping device and a control device. The plummer is fixed on the base for locking the electronic device. The flipping device is fixed on the base for opening and closing the cover of the electronic device. The control device includes an optical fiber sensor for sensing the movement of the cover of the electronic device. The control device connects with the flipping device so as to control the flipping device.

Other advantages and novel features will become more apparent from the following detailed description when taken in conjunction with the accompanying drawings.

BRIEF DESCRIPTION OF THE DRAWINGS

Many aspects of the testing system can be better understood with reference to the following drawings. The components in the drawings are not necessarily drawn to scale, the emphasis instead being placed upon clearly illustrating the principles of the present testing system. Moreover, in the drawings, like reference numerals designate corresponding parts throughout the several views.

DETAILED DESCRIPTION OF THE INVENTION

Figure 1:
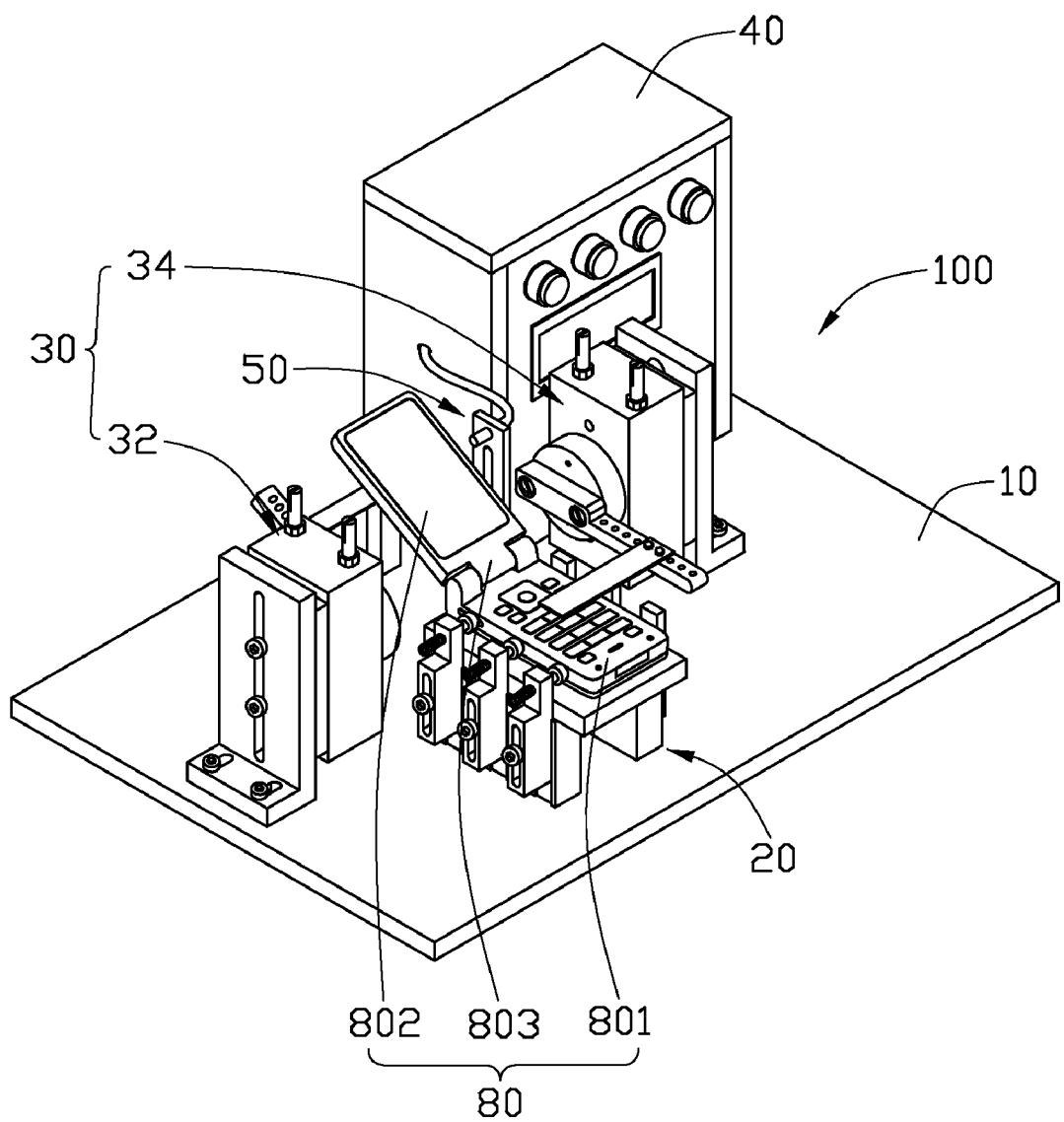
FIG. 1 is an isometric view of a testing system in accordance with a first present embodiment, showing a flip-type electronic device is in test.

In a first present embodiment, referring now to FIG. 1, a testing system 100 is used to test a flip-type electronic device 80. The electronic device 80 includes a main body 801 and a cover 802. A hinge 803 connects the main body 801 and the cover 802, and the cover 802 can rotate relative to the main body 801 by the role of the hinge 803. The testing system 100 includes a base 10, a supporting module 20, a flipping device 30, a control device 40 and a fixing mechanism 50.

The base 10 is approximately a rectangular flat board. The supporting module 20, the flipping device 30, the control device 40 and the fixing mechanism 50 are fixed on the base 10. The base 10 may advantageously, be made of a metal so as to have enough weight to balance the members on it.

Figure 2:
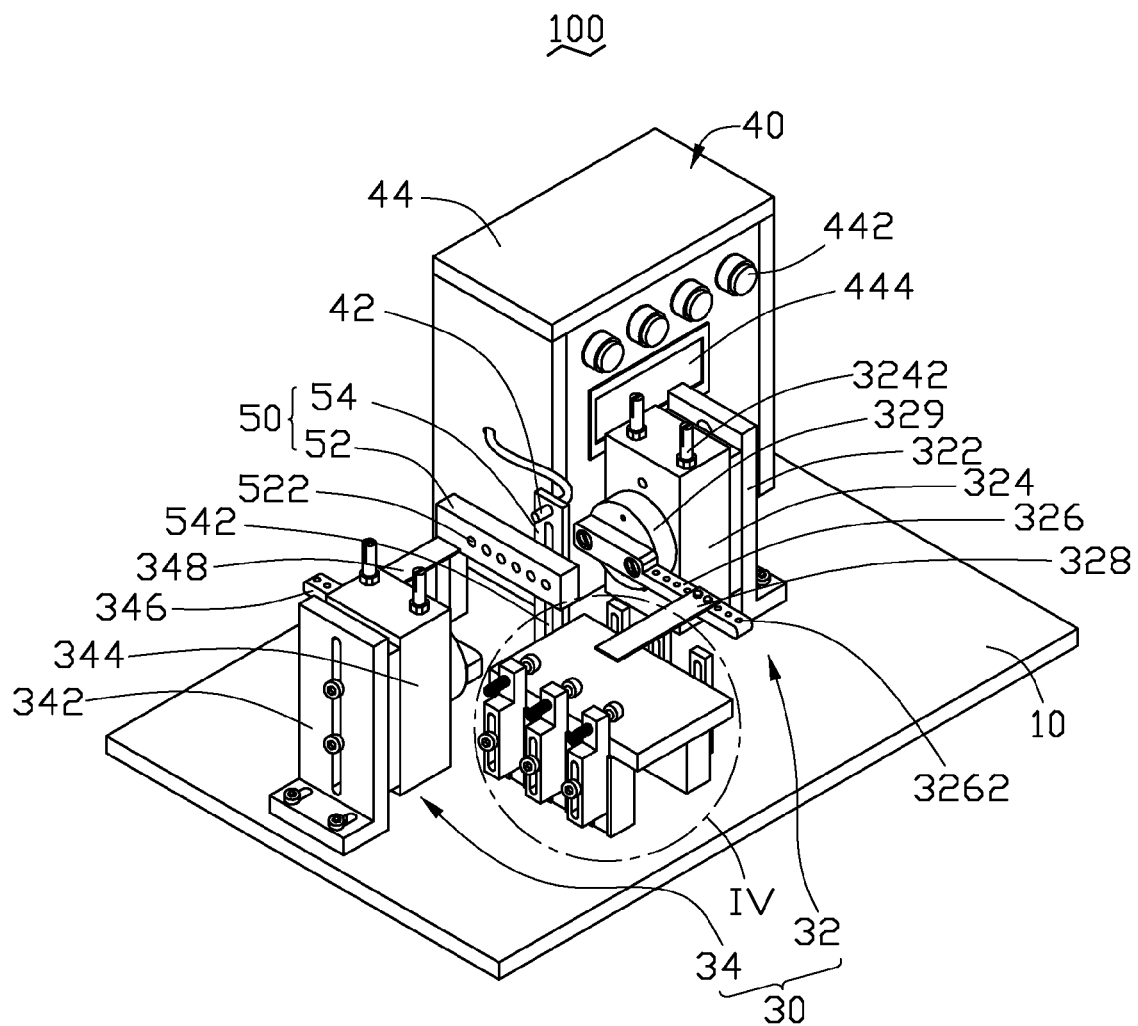
FIG. 2 is similar to FIG. 1, but showing without the electronic device.
Figure 3:
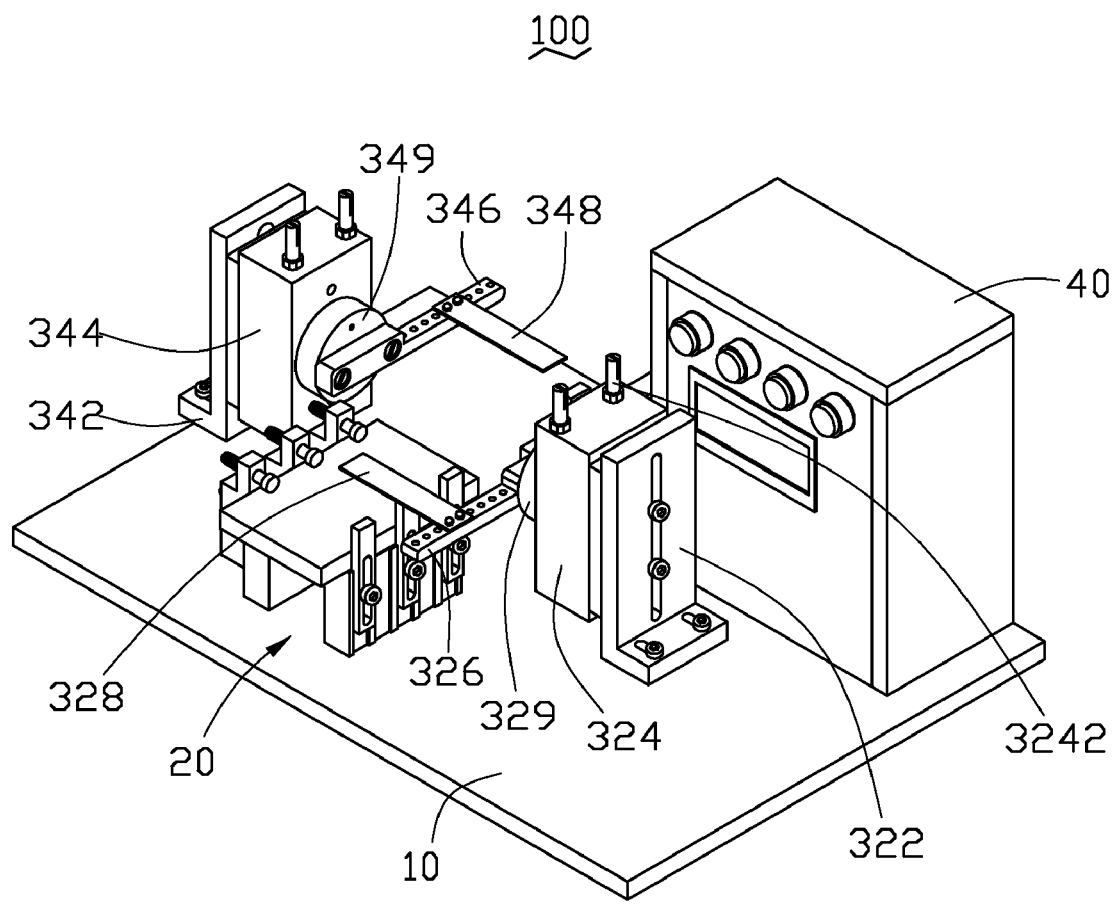
FIG. 3 is similar to FIG. 2, but showing another aspect.
Figure 4:
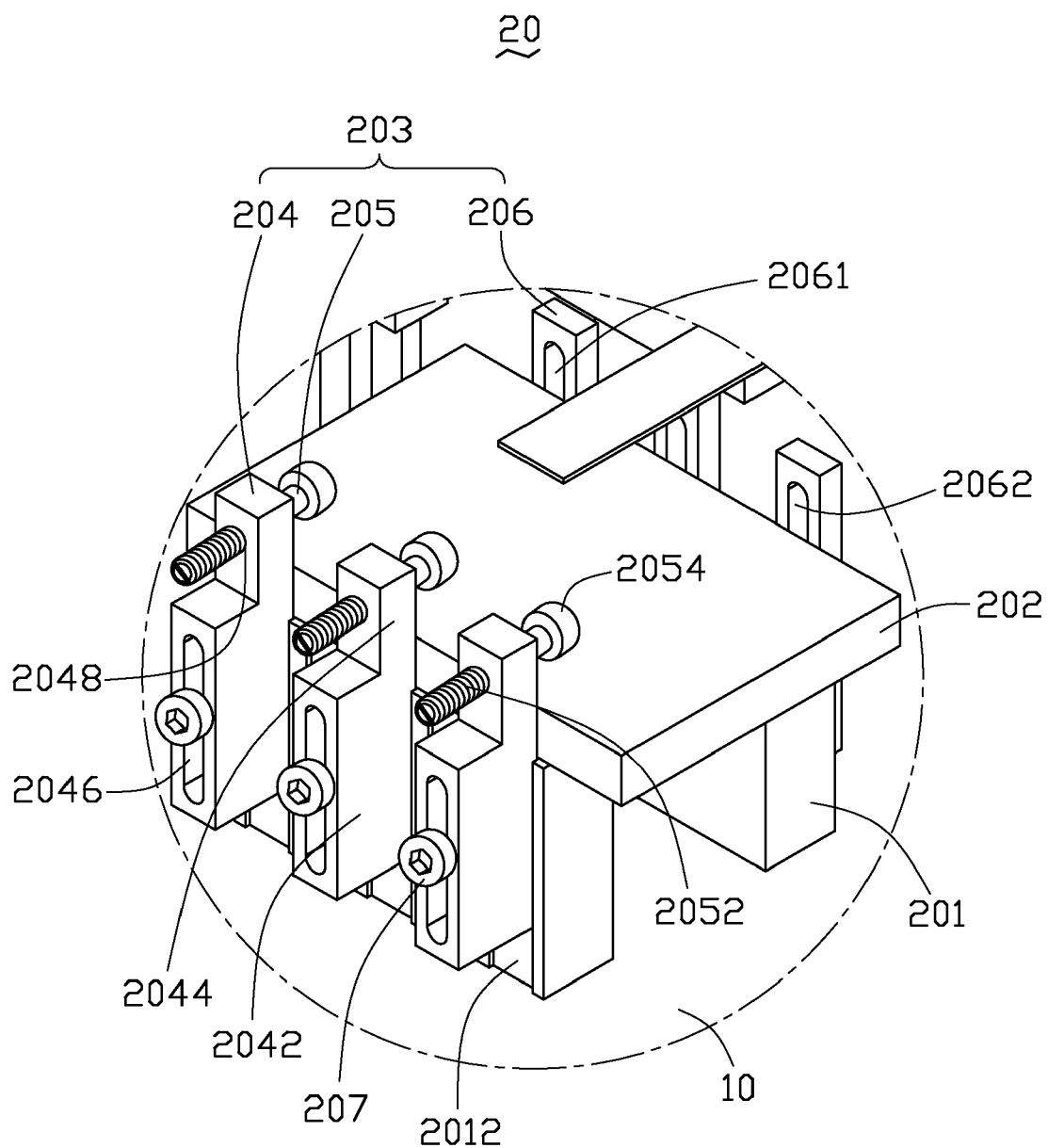
FIG. 4 is an enlarged view of a circled portion IV of FIG. 2.

Also referring to FIGS. 2-4, the supporting module 20 includes two supporting arms 201, a flat board 202, and a positioning module 203. The two supporting arms 201 are symmetrically fixed on the base 10. Each supporting arm 201 has three spaced receiving grooves 2012 formed defined thereof. A screw hole (not shown) is defined in each supporting arm 201. The flat board 202 may be soldered/melded on the supporting arms 201 or be integrally formed with the supporting arms 201, for supporting the electronic device 80.

The positioning module 203 includes three stepped-shape sliding blocks 204, three clamping screws 205 and three stoppers 206. Each sliding block 204 has a fixing portion 2042 and an extending portion 2044. Each fixing portion 2042 has a first sliding slot 2046 defined along a longitudinal direction thereof. A first screw hole 2048 is defined in each extending portion 2044 for receiving a given clamping screw 205. The clamping screw 205 includes a screw portion 2052 and a flange portion 2054 at an end thereof. The screw portion 2052 is rotatably engaged in the first screw hole 2048. Each stopper 206 is a rectangular flat board and has a second sliding slot 2062 along a longitudinal direction thereof. The sliding blocks 204/stoppers 206 are received in a given receiving groove 2012 and are fastened to one supporting arm 201 by a fastening screw 207, respectively. Each fastening screw 207 passes the first sliding slot 2046/second sliding slot 2062 and engages in a given screw hole of the supporting arm 201. Thus, the sliding blocks 204 and the stoppers 206 are fastened to the supporting arm 201. Since the fastening screws 207 can be positioned at any position of the corresponding first sliding slot 2046 or the corresponding second sliding slot 2062, the height of the sliding blocks 204 or the stoppers 206 can be adjusted upward and downward.

The flipping device 30 includes an opening structure 32 and a closing structure 34. The opening structure 32 and the closing structure 34 are respectively positioned at the two opposite sides of the supporting module 20. The opening structure 32 has a first fixing plate 322, a first cylinder 324, a first flipping arm 326 and a first rising plate 328. The first fixing plate 322 is firmly fixed on the base 10 and the first cylinder 324 is firmly mounted on the first fixing plate 322.

A first rotating mechanism 329 is fixed in the first cylinder 324 connected with the first flipping arm 326. An angle adjusting knob 3242 is set on the first cylinder 324 so as to adjust the rotation angle of the first flipping arm 326. The control device 40 controls the first rotating mechanism 329. The first flipping arm 326 has a plurality of screw holes 3262 defined therein in space. The first rising plate 328 is vertically fastened to the first flipping arm 326 by engagement of two screws (not labeled) and two screw holes 3262 of the first flipping arm 326. Accordingly, the position of the first rising plate 328 can be adjusted by choosing different screw holes 3262 to be engaged. The first rising plate 328 is over the flat board 202, for setting up the cover 802 of the electronic device 80. The first flipping arm 326 with the first rising plate 328 can be driven to rotate by the first rotating mechanism 329.

The structure of the closing structure 34 is almost similar to the opening structure 32. The closing structure 34 includes a second fixing plate 342, a second cylinder 344, a second flipping arm 346 and a second rising plate 348. A second rotating mechanism 349 is fixed in the second cylinder 344 and is connected with the second flipping arm 346. The second rising plate 348 is far away from the flat board 202 and is opposite to the first rising plate 328. The height of the second rising plate 348 is lower than the first rising plate 328 for closing the cover 802 of the electronic device 80.

The control device 40 includes a pneumatically operated equipment (not shown), a data processor (not shown) and an optical fiber sensor 42. The pneumatically operated equipment and the data processor are fixed in a box 44. Several buttons 442 and a display 444 are set on the box 44 and electronically connected with the data processor. Therefore, the user can be give an order to the data processor via the buttons 442 and read a test result via the display 444. The pneumatically operated equipment is connected with the opening structure 32 and the closing structure 34, and is used to driven the rotating mechanisms 329, 349 of the flipping device 30. The data processor is electronically connected with the pneumatically operated equipment and the optical fiber sensor 42. The optical fiber sensor 42 is used to determine whether the test is normal, and transmit signal to the data processor. The data processor gives order to the pneumatically operated equipment and receives signals from the optical fiber sensor 42.

The fixing mechanism 50 includes a locking block 52 and a sliding plate 54. The locking block 52 is firmly mounted on the base 10 and has a plurality of screw holes 522 defined therein in space. The sliding plate 54 is rectangular in shape and has a sliding slot 542 defined along a longitudinal direction thereof. A through hole (not labeled) is positioned at one end of the sliding plate 54. The optical fiber sensor 42 is fixed in the through hole. The sliding plate 54 is fastened to the locking block 52 via a screw (not shown) passing the sliding slot 542 thereof and being engaged in a given screw hole 522 of the locking block 52. Since the screw can be engaged in each screw hole 522 of the locking block 52, the position of the sliding plate 54 can be changed according to the shape of the electronic device 80. The highness of the optical fiber sensor 42 can be adjusted since the screw can slide in the sliding slot 542 of the sliding plate 54.

In use, the electronic device 80 is first placed on the flat board 202. The sliding blocks 204 and the stoppers 206 are then adjusted at a perfect position. The clamping screws 205 are rotated to resist one side of the electronic device 80, and the stopper 206 resists the other side of the electronic device 80. Accordingly, the electronic device 80 is locked by the supporting module 20. The first rising plate 328 is placed between the cover 802 and the main body 801 of the electronic device 80. The user input parameter values into the data processor via the buttons 442 and fixes the rotation degree of the flipping arms 326, 346 via the angle adjusting knobs 3242. After that, the user starts the testing system 100. The data processor gives orders to the pneumatically operated equipment according to the parameter values. The pneumatically operated equipment drives the rotating mechanisms 329 to function. Accordingly, the first flipping arm 326 of the opening structure 32 rotates, so that the first rising plate 328 raises the cover 802. The cover 802 rotates relative to the main body 801 by the role of the hinge 803 until the cover 802 reaches the second rising plate 348 of the closing structure 34. The second rising plate 348 pushes the cover 802 back while the first rising plate 328 returns to its original position. The optical fiber sensor 42 senses that the cover 802 moves in front thereof and sends the signal to the data processor. The data processor records the moving times of the cover 802. The opening structure 32 and the closing structure 34 repeatedly work until the failure of the hinge 803.

When the hinge 803 is failed, the cover 802 cannot rotate. The optical fiber sensor 42 cannot sense the movement of the cover 802 and then transmits a signal to the data processor. Accordingly, the data processor stops the pneumatically operated equipment. The test is finished, and the result is shown in the display 444.

Figure 5:
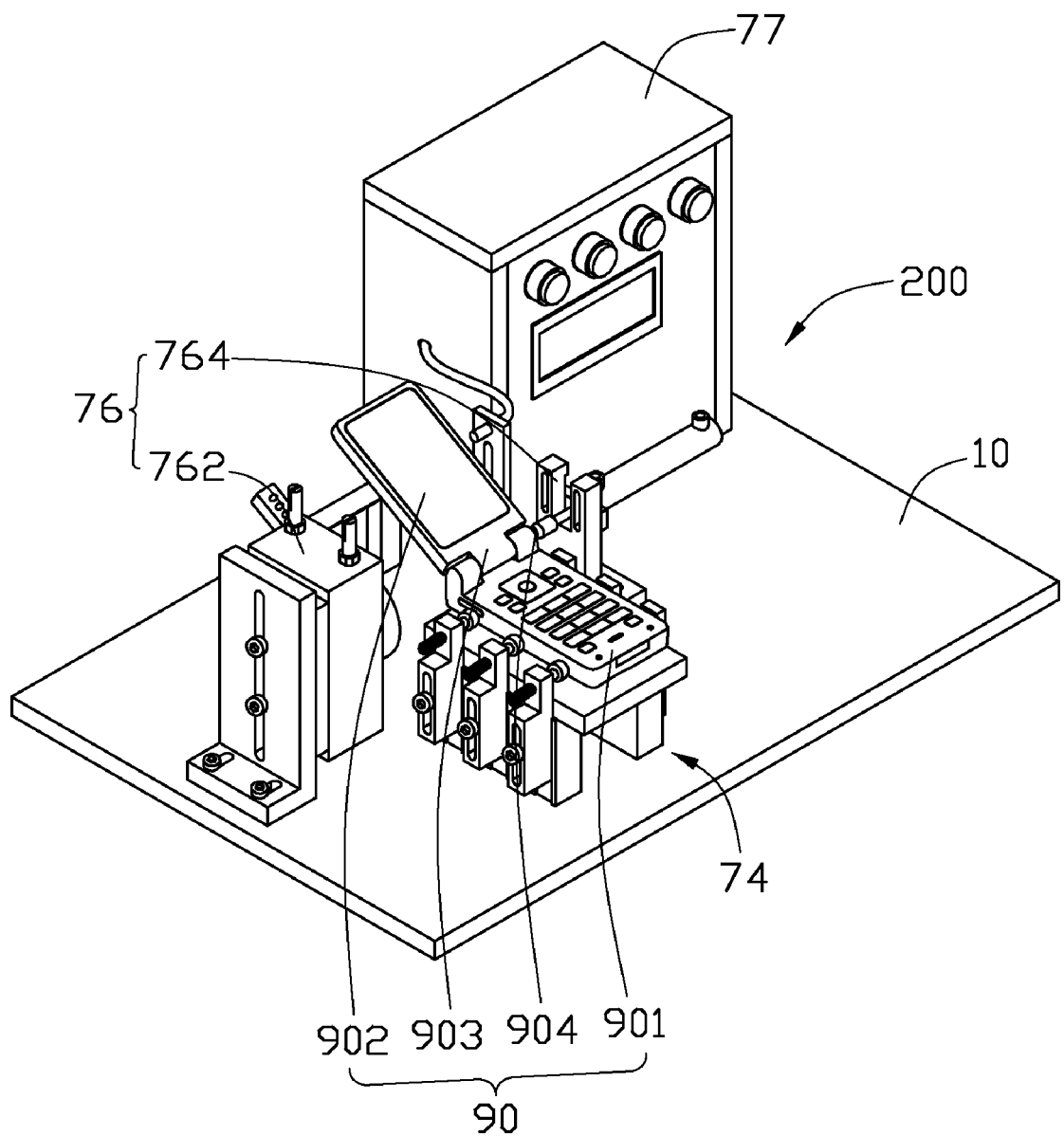
FIG. 5 is an isometric view of a testing system in accordance with a second present embodiment, showing a flip-type electronic device is in test.
Figure 6:
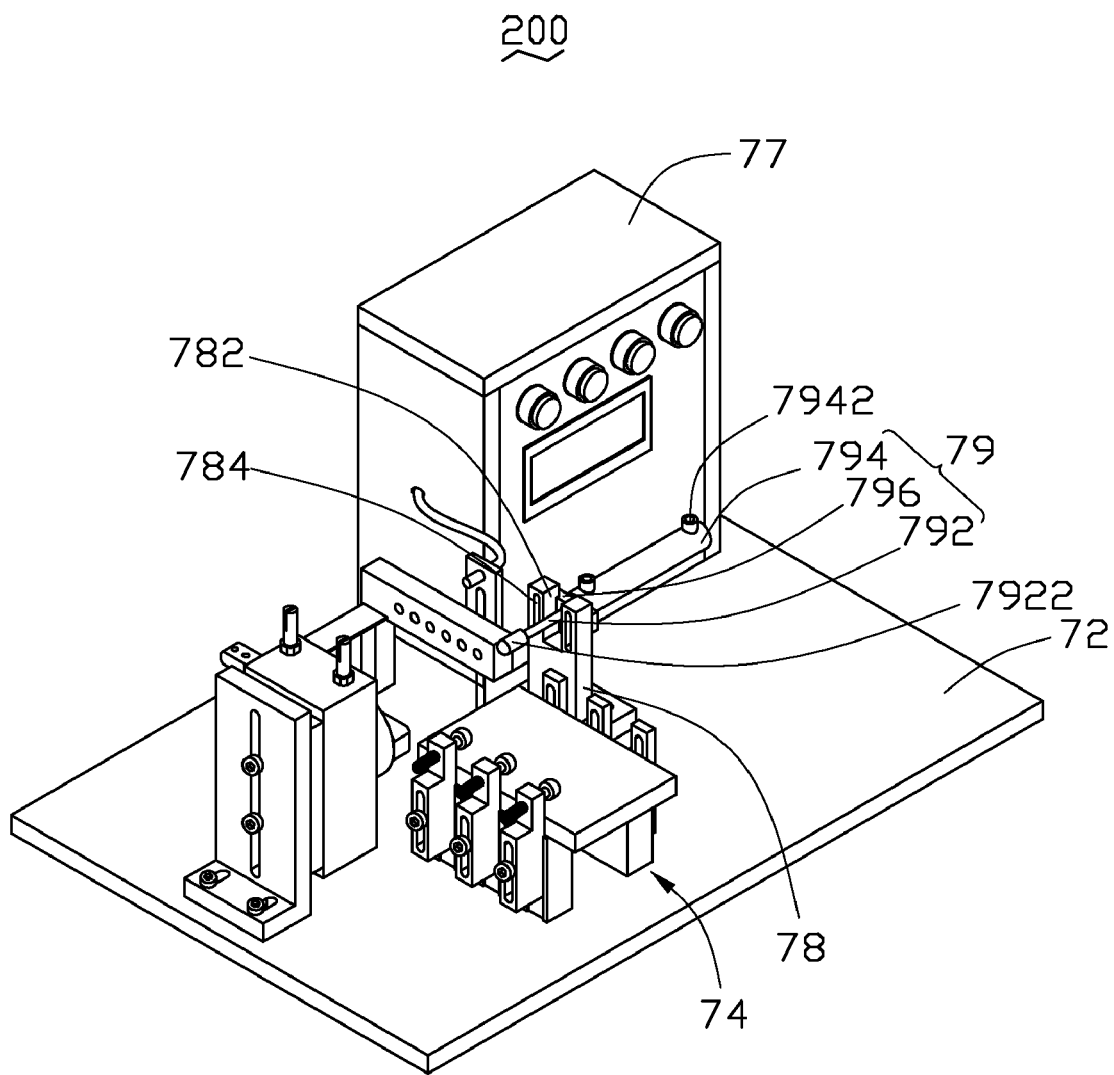
FIG. 6 is similar to FIG. 5, but showing without the electronic device.

In a second present embodiment, referring to FIGS. 5 and 6, the testing system 200 is used to test a flip-type electronic device 90. The electronic device 90 includes a main body 901 and a cover 902. An automatic rotary hinge 903 connects with the main body 901 and the cover 902. The cover 902 can rotate relative to the automatic rotary hinge 903. A reset-button 904 is set on one side of the electronic device 90 for releasing the hinge 903, so that the cover 902 with the hinge 903 can rotate automatically.

The testing system 200 has a base 72, a supporting module 74, a flipping device 76 and a control device 77. The flipping device 76 includes an opening structure 762 and a closing structure 764. The opening structure 762 has a fixing plate 78 and an injecting member 79. The fixing plate 78 is fixed on the base 72 and has a receiving gap 782 defined therein. Two sliding slots 784 are positioned next to the receiving gap 782.

The injecting member 79 includes a sliding post 792, a sleeve 794 and a positioning plate 796. The positioning plate 796 has two screw holes (not shown) defined therein. The position of the two screw holes corresponds to the sliding slots 782. Two screws respectively pass a given sliding slot 782 and are rotated into a corresponding screw hole of the positioning plate 796. Since each screw is able to slide in the sliding slot 782 of the fixing plate 78, the height of the sliding post 792 can be changed according to position of the reset-button 904. The sliding post 792 has a pressing portion 7922 at one end thereof and the other end thereof is slidingly received in the sleeve 794. Two air holes 7942 are positioned in the sleeve 794 for inputting air from the control device 77. The sliding post 792 is injected to press the reset-button 904 of the electronic device 90 at interval time.

When the reset-button 904 is pressed down, the hinge 903 automatically rotates with the cover 902. The reset-button 904 then returns automatically to its original position. The testing process is similar to that of the first present embodiment.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A failure testing system for a flip-type electronic device, the flip-type electronic device comprising a cover and a main body, a hinge connecting with the cover and the main body, the testing system comprising:
   a base;
   a supporting module being fixed on the base for locking the flip-type electronic device;
   a flipping device being fixed on the base for opening and closing the cover of the flip-type electronic device; and
   a control device including an optical fiber sensor for sensing the movement of the cover of the flip-type electronic device, the control device connecting with the flipping device so as to control the flipping device, wherein when the optical fiber sensor no longer senses movement of the cover, a failure is detected and a signal is sent to the control device to automatically stop the flipping device.

2. The testing system as claimed in claim 1, wherein the supporting module comprises two supporting arms and a flat board which is mounted on the supporting arms.

3. The testing system as claimed in claim 2, wherein the supporting module further comprises a fixing module which includes at least one sliding block, at least one stopper and at least one clamping screw, the at least one sliding block and the at least one stopper being respectively positioned at the opposite sides of the flat board and attached to a supporting arm, and the at least one screw being rotately attached to the at least one sliding block.

4. The testing system as claimed in claim 3, wherein each sliding block and each stopper respectively have a sliding slot defined therein, each sliding block and each stopper being fastened to a corresponding supporting arm using a screw, and each fastening screw passes a corresponding sliding slot.

5. The testing system as claimed in claim 1, wherein the flipping device comprises an opening structure and a closing structure, and the opening structure and the closing structure are positioned at two sides of the supporting module.

6. The testing system as claimed in claim 5, wherein the opening structure comprises a first rotating mechanism, a first flipping arm and a first rising plate, the first flipping arm being attached to the rotating mechanism, and the rising plate being attached to the flipping arm.

7. The testing system as claimed in claim 6, wherein the first flipping arm has a plurality of screw holes defined therein, and the first rising plate is attached to the first flipping arm by engagement between a screw and one of the screw holes of the first flipping arm.

8. The testing system as claimed in claim 7, wherein the closing structure comprises a second rotating mechanism, a second flipping arm and a second rising plate, the second flipping arm being attached to the second rotating mechanism, and the second rising plate being attached to the second flipping arm.

9. The testing system as claimed in claim 8, wherein the second flipping arm has a plurality of screw holes defined therein, and the second rising plate is attached to the second flipping arm by engagement between a screw and one of the screw holes of the second flipping arm.

10. The testing system as claimed in claim 5, wherein the opening structure further comprises a fixing plate and an injecting member, the fixing plate is fixed on the base, and the injecting member is attached to the fixing plate.

11. The testing system as claimed in claim 10, wherein the injecting member includes a sliding post, a sleeve and a positioning plate, the sliding post being slidingly received in the sleeve, and the positioning plate being attached to the fixing plate.

12. The testing system as claimed in claim 11, wherein the fixing plate has a receiving gap and two sliding slots defined therein, the sliding slots being respectively positioned at two sides of the receiving gap, the sliding post being positioned across the receiving gap, and the positioning plate being attached to the fixing plate using two screws, the two screws being respectively engaged in a corresponding sliding slot of the fixing plate.

13. The method as claimed in claim 12, wherein the sleeve defines two air holes therein, the sleeve being connected with the control device via the air holes.

14. The method as claimed in claim 13, including a light guiding plate is made of one or more thermoplastic resins selected from a group consisting of PVC (polyvinyl chloride), polycarbonate and polystyrene.

* * * * *